(12) United States Patent
Varoglu et al.

(10) Patent No.: US 10,204,517 B2
(45) Date of Patent: *Feb. 12, 2019

(54) WIRELESS VEHICLE SYSTEM FOR ENHANCING SITUATIONAL AWARENESS

(71) Applicant: Apple Inc., Cupertino, CA (US)

(72) Inventors: Devrim Varoglu, Santa Clara, CA (US); Ravisastry Parupudi, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/445,839

(22) Filed: Feb. 28, 2017

(65) Prior Publication Data

US 2017/0236420 A1 Aug. 17, 2017

Related U.S. Application Data

(63) Continuation of application No. 13/605,245, filed on Sep. 6, 2012, now Pat. No. 9,595,195.

(51) Int. Cl.
*G08G 1/16* (2006.01)
*H04B 17/318* (2015.01)
(Continued)

(52) U.S. Cl.
CPC .............. *G08G 1/163* (2013.01); *B60T 7/22* (2013.01); *G01S 5/0252* (2013.01);
(Continued)

(58) Field of Classification Search
CPC ......... G08G 1/096741; G08G 1/09626; G08G 1/16; G08G 1/165; G08G 1/166; G06K 9/00805
See application file for complete search history.

(56) References Cited

U.S. PATENT DOCUMENTS 6,034,641 A 3/2000 Kudoh et al.
6,489,888 B1 12/2002 Honeck et al.
(Continued)

OTHER PUBLICATIONS

Hisaka, et al., "A Strudy of On-board Sensing System using RSSI for Intersection Safety," TRB 2012 Annual Meeting, Submission date Nov. 15, 2011 (14 pages).

*Primary Examiner* — James J Yang
*Assistant Examiner* — Kevin Lau
(74) *Attorney, Agent, or Firm* — Treyz Law Group, P.C.; G. Victor Treyz; Vineet Dixit

(57) ABSTRACT

Electronic equipment in vehicles may transmit and receive wireless messages. Each wireless message that is transmitted by a transmitter may include information on the vehicle from which it is being transmitted, information on the location of the transmitter within the vehicle, and other vehicle status information. Receiving equipment in vehicles may be used to receive the transmitted messages. Received signal strength indicator information may be associated with the transmitted messages. Using the received signal strength indicator information and information on the locations of the transmitters within the vehicles in which the transmitters are installed, equipment in a receiving vehicle may determine locations for nearby vehicles. Alerts may be presented to a driver of a vehicle and other suitable actions may be taken based on the locations of nearby vehicles, vehicle type information, and other information regarding traffic in the vicinity of the driver.

19 Claims, 7 Drawing Sheets

(51) Int. Cl.
*B60T 7/22* (2006.01)
*G01S 5/02* (2010.01)
*G08G 1/0965* (2006.01)
*H04W 4/80* (2018.01)

(52) U.S. Cl.
CPC .......... *G01S 5/0289* (2013.01); *G08G 1/0965* (2013.01); *G08G 1/166* (2013.01); *G08G 1/167* (2013.01); *H04B 17/318* (2015.01); *H04W 4/80* (2018.02)

(56) References Cited

U.S. PATENT DOCUMENTS

| | | | |
|---|---|---|---|
| 7,382,274 B1 * | 6/2008 | Kermani | B60K 31/0058 340/435 |
| 8,179,281 B2 | 5/2012 | Strauss | |
| 8,587,454 B1 | 11/2013 | Dearworth | |
| 8,836,580 B2 | 9/2014 | Mendelson | |
| 2007/0032245 A1 | 2/2007 | Alapuranen | |
| 2007/0268155 A1 * | 11/2007 | Holmes | G01S 5/0289 340/901 |
| 2008/0033805 A1 | 2/2008 | Padin | |
| 2008/0045234 A1 | 2/2008 | Reed | |
| 2009/0247186 A1 | 10/2009 | Ji et al. | |
| 2011/0093330 A1 | 4/2011 | Burckart et al. | |
| 2011/0110338 A1 | 5/2011 | Khoryaev et al. | |
| 2011/0171912 A1 | 7/2011 | Beck et al. | |
| 2011/0189980 A1 | 8/2011 | Proulx et al. | |
| 2011/0195701 A1 | 8/2011 | Cook et al. | |
| 2011/0223931 A1 | 9/2011 | Buer et al. | |
| 2011/0244802 A1 | 10/2011 | Kozlowski et al. | |
| 2012/0083998 A1 * | 4/2012 | Kizaki | G08G 1/093 701/300 |
| 2012/0112895 A1 | 5/2012 | Jun | |
| 2014/0066091 A1 | 3/2014 | Varoglu et al. | |

* cited by examiner

WIRELESS VEHICLE SYSTEM FOR ENHANCING SITUATIONAL AWARENESS

This application is a continuation of U.S. non-provisional patent application Ser. No. 13/605,245 filed Sep. 6, 2012, which is hereby incorporated by reference herein in its entirety. This application claims the benefit of and claims priority to U.S. non-provisional patent application Ser. No. 13/605,245 filed Sep. 6, 2012.

BACKGROUND

This relates generally to mobile electronic equipment such as equipment in a vehicle and, more particularly, to systems in which a vehicle obtains situational awareness information from wireless transmissions from nearby vehicles.

Vehicles are sometimes provided with safety equipment such as parking sensors, lane departure warning equipment, and blind-spot detection systems. A parking sensor can be used to alert a driver when a vehicle is nearly in contact with a parked car or other stationary object, but has limited range and cannot be used to increase safety when a vehicle is being driven on a highway. Lane departure warning equipment can sense when a driver has started to drift into an adjacent lane, but does not warn the driver about vehicles in the adjacent lane. Blind spot detection systems can use radar or an infrared sensor to monitor a driver's blind spot, but do not offer complete coverage of areas around the driver's vehicle and provide no information to the driver on the nature of intrusions into the driver's blind spot.

It would therefore be desirable to be able to provide improved systems for providing drivers in vehicles with enhanced situational awareness when driving on a road.

SUMMARY

Electronic equipment in vehicles may transmit and receive wireless messages. Wireless protocols such as the Bluetooth® Low Energy protocol may be used in transmitting and receiving the messages.

Each vehicle may contain multiple transmitters. For example, in a rectangular vehicle with four corners, a transmitter may be located at each of the four corners. Transmitters may be calibrated so that signal strength information may be used in gauging the distance between the transmitters and receiving equipment in another vehicle.

Each wireless message that is transmitted by a transmitter may include information on the vehicle from which it is being transmitted, information on the location of the transmitter within the vehicle, and other vehicle status information. Receiving equipment in vehicles may be used to receive the transmitted messages.

Received signal strength indicator information may be associated with the messages. Using the received signal strength indicator information and information on the locations of the transmitters within the vehicles in which the transmitters are installed, equipment in a receiving vehicle may determine the locations of nearby vehicles. Satellite navigation system signals may be used in identifying the location of a vehicle that is being driven. Electronic equipment in a vehicle may present an icon of the vehicle that is being driven on a display.

Alerts may be presented to a driver of a vehicle based on the locations of nearby vehicles, vehicle type information, and other information regarding traffic in the vicinity of the driver. For example, icons of nearby vehicles may be presented on the display adjacent to the icon of the vehicle that is being driven. A driver may also be alerted to the presence of nearby emergency services vehicles. Vehicle type information may also be used to help drivers identify nearby vehicles such as motorcycles and trucks.

Further features of the invention, its nature and various advantages will be more apparent from the accompanying drawings and the following detailed description of the preferred embodiments.

DETAILED DESCRIPTION

Figure 1:
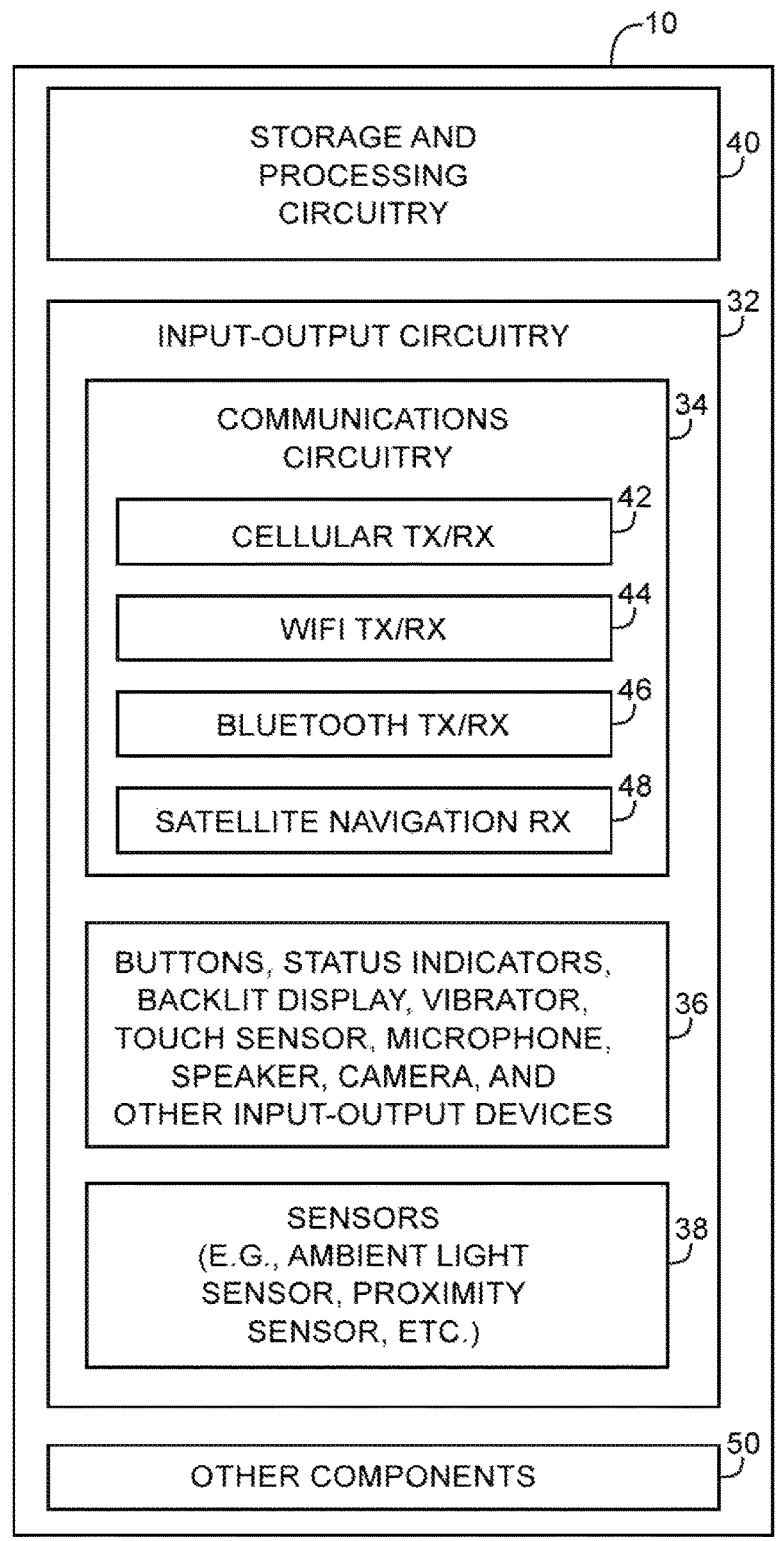
FIG. 1 is a schematic diagram of illustrative electronic equipment in accordance with an embodiment of the present invention.

Electronic equipment may be provided with wireless transceiver circuitry. For example, mobile electronic equipment such as electronic equipment in a vehicle or other mobile structure may also be provided with the ability to transmit and receive wireless signals. Vehicles may, for example, be provided with transmitters. Each vehicle may be provided with a set of transmitters that are located at the corners of the vehicle or other suitable location. By transmitting wireless advertisement messages using these transmitters, the vehicle can make its presence known to nearby vehicles.

To monitor the surroundings of a vehicle while the vehicle is being driven on a highway or other road, the vehicle may be provided with a wireless receiver. The wireless receiver may receive wireless transmissions from nearby vehicles. For example, a receiver in a vehicle that is traveling along the center lane of a highway may receive wireless advertisement messages from vehicles on the highway that are in front of the vehicle, behind the vehicle, and to the left and right sides of the vehicle. Received wireless messages may be analyzed to evaluate signal strength information. Each received message may, for example, be processed to produce a corresponding received signal strength indicator (RSSI) value that is indicative of the signal strength of that received message.

To identify itself and thereby provide surrounding vehicles with a desired amount of situational awareness, each transmitter may broadcast wireless advertisement messages that contain information such as the location of the transmitter within the transmitting vehicle (e.g., left front bumper, etc.). The wireless advertisement messages that are transmitted may also include information such as license plate information, vehicle identification number information, driver name and address, insurance information, and vehicle type (e.g., passenger car, van, truck, tractor-trailer, motorcycle, emergency vehicle, ambulance, police car, fire truck, etc.). To ensure privacy, sensitive information may be encrypted and/or partly or fully blocked, redacted, or otherwise anonymized.

Receiving vehicles can use the transmitted wireless signals to determine the relative locations of nearby vehicles. Once the positions of nearby vehicles have been identified, a receiving vehicle may alert a driver or may take other suitable action. For example, a user may be presented with an audible alert such as a tone, buzzer, synthesized voice output, or a visual alert presented on a display or the driving controls of the vehicle can be controlled automatically. As an example, an alert may inform the driver of overtaking vehicles or vehicles in the immediate vicinity of the driver. Alerts may also be presented to the driver when the driver uses a turn signal, brake pedal, accelerator pedal, steering wheel, or other driving control to indicate that the driver is making a lane change, accelerating or decelerating, or otherwise making a driving maneuver that might interfere with nearby traffic. In response to detecting the presence of a vehicle cutting in front of a driver, the driver may be presented with an alert and/or actions may be taken such as automatically applying the brakes in the driver's vehicle to slow the driver's vehicle and thereby prevent a collision.

Illustrative electronic equipment of the type that may be used in transmitting and receiving wireless signals for use in providing mobile equipment such as vehicles with information on nearby equipment such as nearby vehicles or other equipment is shown in FIG. 1. In a typical system, one or more pieces of equipment such as electronic equipment 10 may be used in transmitting and receiving wireless signals. For example, a system may include a mobile piece of equipment such as a vehicle that is receiving transmitted signals and one or more nearby mobile pieces of equipment such as vehicles that are transmitting the transmitted signals. Each piece of equipment in this type of system may include, for example, some or all of the circuitry of equipment 10 of FIG. 1. Multiple transmitters and receivers may be included in each vehicle.

Electronic equipment such as equipment 10 of FIG. 1 may be a vehicle such as an automobile, truck, motorcycle, bicycle, ambulance, fire truck, police car, or other emergency services vehicle, or may be other mobile and/or stationary electronic equipment. Both receiving equipment such as a vehicle being driven by a user and transmitting equipment such as nearby vehicles on a road may have bidirectional wireless capabilities (e.g., to support the transmission and receipt of data using protocols such as Bluetooth® protocols).

As shown in FIG. 1, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of equipment 10. The processing circuitry may be based on a processor such as a microprocessor and other suitable integrated circuits. With one suitable arrangement, storage and processing circuitry 40 may be used to run software on equipment 10, such as mapping applications (e.g., navigation applications for a vehicle or mobile device), email applications, media playback applications, operating system functions, software for capturing and processing images, software implementing functions associated with gathering and processing sensor data, software for issuing alerts and taking other actions when suitable criteria are satisfied, software for monitoring and detecting driver input to driver controls in a vehicle, software that controls vehicle functions in a vehicle such as driving functions (e.g., in at least partial response to driver input to vehicle controls, and information on the locations of nearby vehicles), software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 1, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 1 may include an ambient light sensor, proximity sensor, temperature sensor, accelerometer, and other sensors for gathering data for equipment 10.

Equipment 10 may also include other components 50. For example, equipment 10 may form some or all of a vehicle including parts such as a chassis, wheels connected to the chassis, a motor for driving the wheels, a body for enclosing the motor and chassis, brakes, lights, audio and video equipment, navigation system equipment, a steering wheel, and other components for controlling the vehicle, gathering input from a user (driver) of the vehicle, and supplying output to the user of the vehicle.

Figure 2:
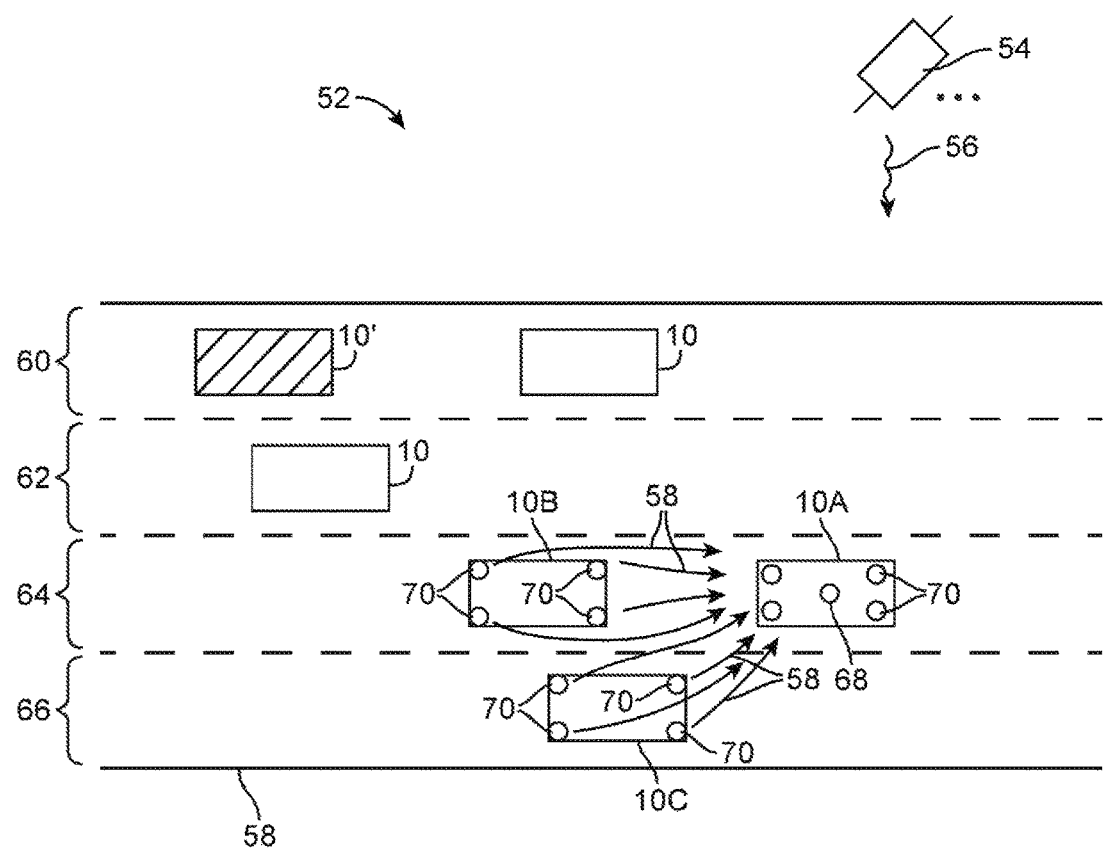
FIG. 2 is a diagram showing how multiple pieces of equipment in vehicles traveling on a road may wirelessly interact with each other in accordance with an embodiment of the present invention.

FIG. 2 is a system diagram showing how multiple pieces of electronic equipment 10 may wirelessly interact with each other. As shown in FIG. 2, system 52 may include multiple pieces of electronic equipment 10. In the example of FIG. 2, equipment 10 is used in forming vehicles that are being driven on road 58 by respective drivers. Other types of electronic equipment may be provided in system 52 if desired. The illustrative configuration of FIG. 2 is merely illustrative.

Road 58 may include one or more lanes such as lanes 60, 62, 64, and 66 on which the vehicles (equipment 10) may be driven by respective drivers. Each vehicle 10 may include wireless circuitry 34 and other components of the type shown in FIG. 1. For example, vehicle 10A may have a wireless circuitry 68 and other circuitry of the type shown in FIG. 1 for receiving and processing wireless advertisement messages that are transmitted by wireless circuits 70 in nearby vehicles such as vehicles 10B and 10C.

Wireless circuits 68 and 70 may be, for example, Bluetooth Low Energy transceivers such as Bluetooth transceiver 46 of FIG. 1. Each of transmitting circuits 70 may be positioned at a suitable location within a transmitting vehicle. For example, a car may have a rectangular outline (when viewed from above). A Bluetooth Low Energy transmitter in this type of arrangement may be placed at each of the four corners of the car.

Each Bluetooth Low Energy transmitter (i.e., each circuit 70 in FIG. 2) may transmit a corresponding Bluetooth Low Energy advertisement message (package). The message may contain information identifying the transmitter and the vehicle from which the transmitter circuit is transmitting. For example, each advertisement message may contain information that informs receiving devices of the location of the transmitter within the vehicle from which the transmission originates. A transmitter 70 that is located on the right front corner of a vehicle may, for example, include information on the identity of the vehicle and the nature of the vehicle as well as information that identifies the location of the transmitter on the right front corner.

Each vehicle 10 may include circuitry (e.g., a Bluetooth Low Energy receiver such as transceiver 46 of FIG. 1 or other wireless circuit 68) for receiving and processing the signals transmitted by transmitters 70. When receiving signals, receiving circuits 68 may extract information from transmitted wireless advertisement messages such as information identifying the vehicle in which the transmitter is located. Other information may also be extracted from transmitted messages such as information on the position of the transmitter within the transmitting vehicle (e.g., right front corner), information on the type of transmitting vehicle (e.g., passenger car, truck, emergency services vehicle, etc.), and other transmitted data.

The circuitry in the receiving vehicle may also determine the value of received signal strength indicator (RSSI) associated with each transmitted advertisement message and may use RSSI values to determine the distance between the receiving circuitry and the transmitting circuitry. If, for example, the Bluetooth Low Energy receiver in a vehicle receives a transmitted message with an RSSI value of 3.7 from the right front bumper of a nearby vehicle and receives a transmitted message with an RSSI value of 2.7 from the left front bumper of the nearby vehicle, the receiving vehicle may conclude that the nearby vehicle is located to the left of the receiving vehicle (from the perspective of the driver). If the receiving vehicle receives messages from the front of a nearby vehicle that are stronger than are being received from the rear of the nearby vehicle, the receiving vehicle may conclude that the nearby vehicle is located behind the receiving vehicle. Information on the relative speed between the transmitting and receiving vehicles can be gathered by processing successive position signals (e.g., dividing position by time to determine velocity) and/or by broadcasting and receiving velocity information in wireless messages. The circuitry in a vehicle can use a speedometer or other equipment within the vehicle to measure the speed of that vehicle.

During operation, a vehicle may use control circuitry 40, input-output circuitry 32, and other components 50 to monitor the surroundings of the vehicle for the presence and activities of nearby vehicles. When situations are identified that deserve attention, the vehicle can take appropriate action. For example, a vehicle can automatically notify the driver of a vehicle of impending collisions, can alert the driver to the presence of overtaking vehicles, can alert the driver to the presence of vehicles in the driver's blind spot, can inform the driver when emergency services vehicles are present, may intervene in driving activities to avoid a collision or otherwise enhance safety, or may otherwise take suitable action in response to processing nearby wireless signals.

If desired, satellite navigation system signals such as signals 56 from satellites 54 may be used in addition to or instead of locally transmitted and received wireless signals in helping to determine the position and relative movement between vehicles. For example, Global Positioning System (GPS) signals may be processed to determine vehicle heading and speed, to determine position of vehicles on road 58 and among lanes 60, 62, 64, and 66, etc.

Each transmitting vehicle has at least one transmitting wireless circuit. The use of multiple transmitting circuits may help enhance the accuracy of position computations. For example, the use of transmitters 70 (e.g., Bluetooth Low Energy transmitters) at the four corners of an automobile body may help receiving vehicles determine the outlines of the transmitting vehicle, the lane of road 58 in which the transmitting vehicle is located, and the distance and relative position between the transmitting vehicle's body and the body of the receiving vehicle. As an example, a receiving vehicle such as vehicle 10A of FIG. 2 that is traveling in lane 64 of road 58 may determine that nearby vehicle 10B is located in the same line (lane 64) and is immediately behind vehicle 10A. Likewise, vehicle 10A may determine that nearby vehicle 10C is located in adjacent lane 66 and is about to pass vehicle 10A on the right hand side of vehicle 10A. Emergency vehicles such as vehicle 10' may not be visible to the driver of vehicle 10A. Nevertheless, vehicles such as vehicle 10' may transmit wireless messages (e.g., Bluetooth Low Energy messages) that inform vehicle 10A that an emergency vehicle is located in the vicinity of vehicle 10A. This may allow vehicle 10A to alert the driver of vehicle 10A using an audible and/or visual alert.

Figure 3:
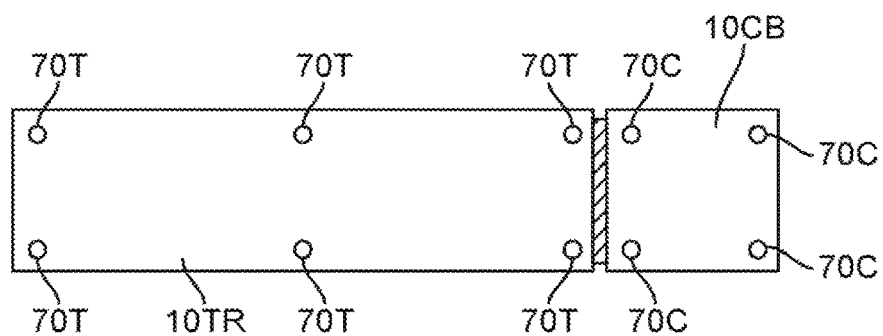
FIG. 3 is a diagram of a vehicle such as a truck that has been provided with wireless transmitters in accordance with an embodiment of the present invention.
Figure 4:
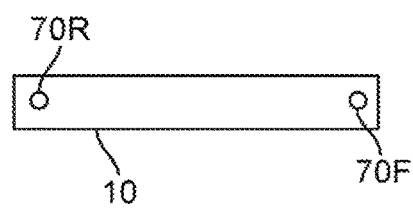
FIG. 4 is a diagram of a vehicle such as a motorcycle that has been provided with wireless transmitters in accordance with an embodiment of the present invention.
Figure 5:
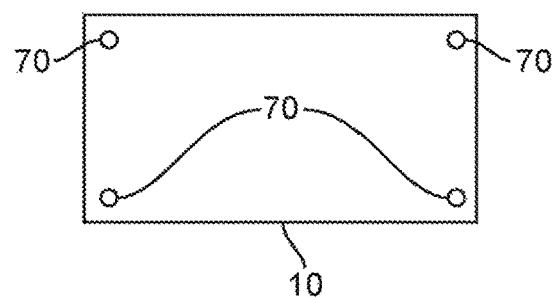
FIG. 5 is a diagram of a vehicle such as an automobile that has been provided with wireless transmitters in accordance with an embodiment of the present invention.

In addition to having different roles (e.g., commercial, passenger, emergency services, etc.), different vehicles may have different shapes and sizes. Larger vehicles may, if desired, be provided with more wireless transmitters 70. For example, tractor trailer truck 10 of FIG. 3 may have a cab such as cab 10CB and a trailer such as trailer 10TR. Cab 10CB may have transmitters 70C located at each of the four corners of cab 10CB. Trailer 10TR may have transmitters 70T located at each of the four corners of trailer 10T and, if desired, along the sides of trailer 10T. In the example of FIG. 4, vehicle 10 is a motorcycle or bicycle having front transmitter 70F and rear transmitter 70R. Vehicle 10 of FIG. 5 may be an automobile or truck with a rectangular outline (when viewed from above). Vehicles of other shapes may be provided with transmitters at other suitable locations. The examples of FIGS. 3, 4, and 5 are merely illustrative.

Receiving equipment such as receivers 68 may extract received signal strength indicator (RSSI) values from each transmitted message. The amount of received signal from a given transmitter (i.e., the RSSI value) decreases as a function of increasing distance, so RSSI values can be used in determining the location of message transmitters. To ensure that RSSI values accurately represent the distance between the transmitter and receiver, transmitters may be calibrated. Transmit power may, for example, be adjusted to account for differences in vehicle body styles, materials, and transmitter mounting locations.

Figure 6:
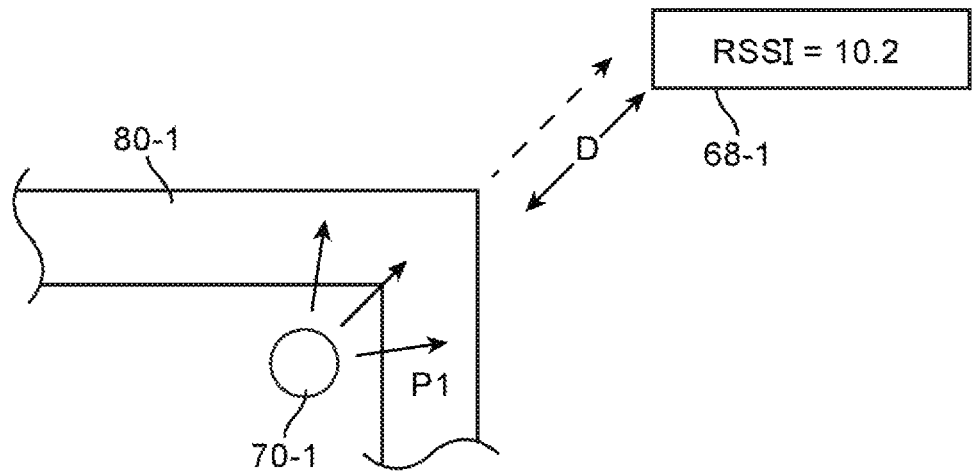
FIG. 6 is a diagram showing how a wireless transmitter that is transmitting through a relatively thick portion of a vehicle body may be configured to transmit wireless signals at a relatively large power to ensure that output from the vehicle is properly calibrated in accordance with an embodiment of the present invention.
Figure 7:
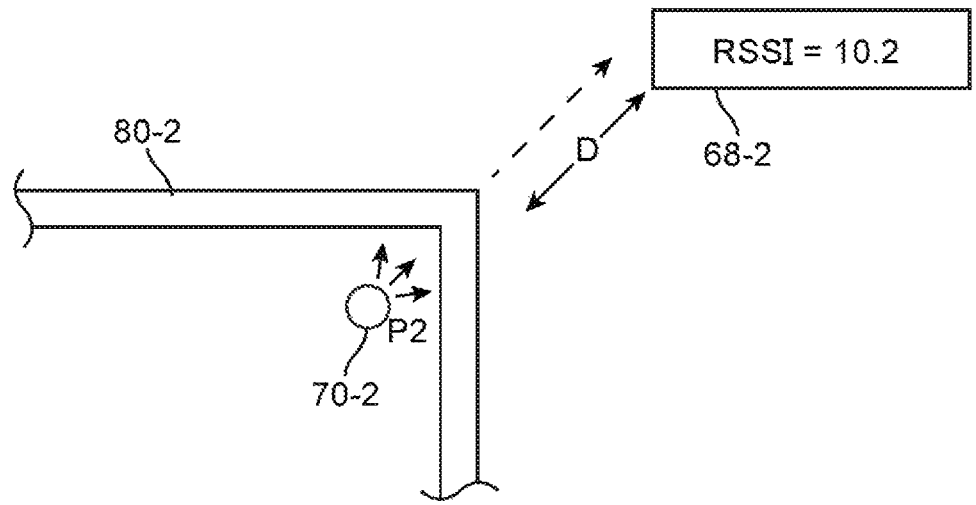
FIG. 7 is a diagram showing how a wireless transmitter that is transmitting through a relatively thin portion of a vehicle body may be configured to transmit wireless signals at a relatively small power to ensure that output from the vehicle is properly calibrated in accordance with an embodiment of the present invention.

As an example, transmitters such as transmitter 70-1 of FIG. 6 that are located behind relatively thick portions of a vehicle body such as structure 80-1 may be configured to transmit wireless signals at a relatively high power of P1. As shown in FIG. 6, in this type of situation, a receiver such as receiver 68-1 that is located at a distance D from transmitter 70-1 may receive transmitted wireless signals with an RSSI value of 10.2. To ensure consistency across vehicles, transmitters such as transmitter 70-2 of FIG. 7 that are located behind relatively thin portions of a vehicle body (or other portions of a vehicle that attenuate radio-frequency signals less than structures 80-1) such as structure 80-2 of FIG. 7 may be configured to transmit wireless signals at a relatively low power of P2. The RSSI value that is measured at a receiver such as receiver 68-2 that is located at distance D from transmitter 70-2 will be the same (10.2 in this example) as for the situation in FIG. 6. By calibrating all transmitters 70 in system 52 accordingly, each receiver 68 can use RSSI values associated with the signals transmitted by transmitters 70 to determine the distances separating each transmitter 70 from the receiver 68. If desired, other techniques may be used for ascertaining the distance between transmitters and receivers (e.g., time-of-flight measurements, etc.). The use of RSSI magnitudes from calibrated transmitters is merely illustrative.

Vehicle 10 (i.e., electronic equipment 10 that forms part of an automobile, truck, or other vehicle) may use displays, speakers, or other output components in input-output circuitry 32 to present visual and/or audible alerts and other information for a driver based on information about other vehicles and driving conditions in the vicinity of the vehicle. During operation, vehicle 10 may analyze received RSSI values and other information associated with wireless advertisement messages transmitted by transmitters 70 in nearby vehicles in real time to monitor the surroundings of vehicle 10 for vehicle movements and other information of interest to the driver of vehicle 10. Vehicle 10 may compare information on vehicle locations, vehicle velocities, vehicle types, and other information to predetermined criteria (e.g., alert criteria). When alert criteria are satisfied, vehicle 10 may present alerts for the driver. Alerts that are presented may inform the driver of overtaking vehicles, of vehicles that are present in the driver's blind spot, of emergency services vehicle, of vehicles that might raise the risk of an impending collision, of vehicles that are near to the driver, or other moving vehicles or structures associated with driving conditions.

Figure 8:
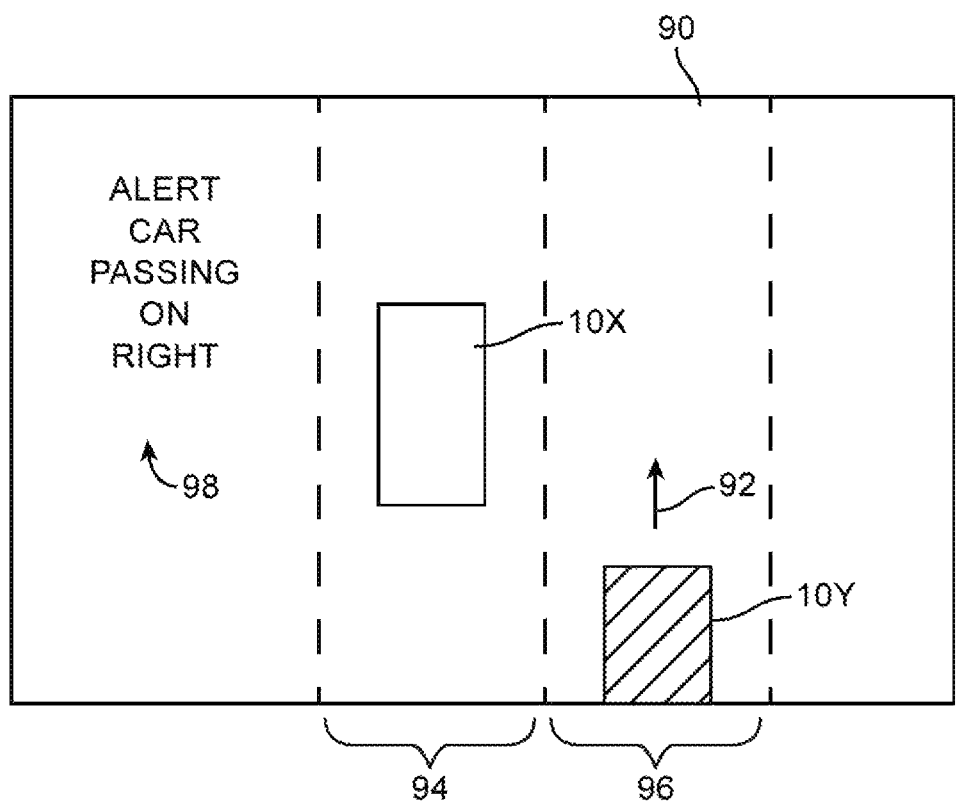
FIG. 8 shows an illustrative display screen in a vehicle that is displaying an alert to provide a driver with enhanced situational awareness such as a diagram of the driver's vehicle and nearby vehicles driving on the same road in accordance with an embodiment of the present invention.

FIG. 8 shows an illustrative alert of the type that vehicle 10 may display for a driver. In the example of FIG. 8, alert 90 includes a graphical representation of two lanes of traffic on a road on which the driver is driving vehicle 10. Vehicle icon 10X in lane 94 of alert 90 corresponds to the position of the driver's vehicle on the road. Vehicle icon 10Y corresponds to a nearby vehicle in adjoining lane 96. Vehicle 10Y is passing the driver's vehicle on the right, leading to a potentially unsafe situation. Alert 90 may therefore contain text (or audio) that such as alert text 98 that informs the driver that an overtaking vehicle is passing the driver on the right. Alerts such as alert 90 may be displayed on a navigation system display in vehicle 10 or on other suitable displays in vehicle 10. Alerts may also be presented using sound (e.g., a chime, a beep, using voice output, etc.).

Figure 9:
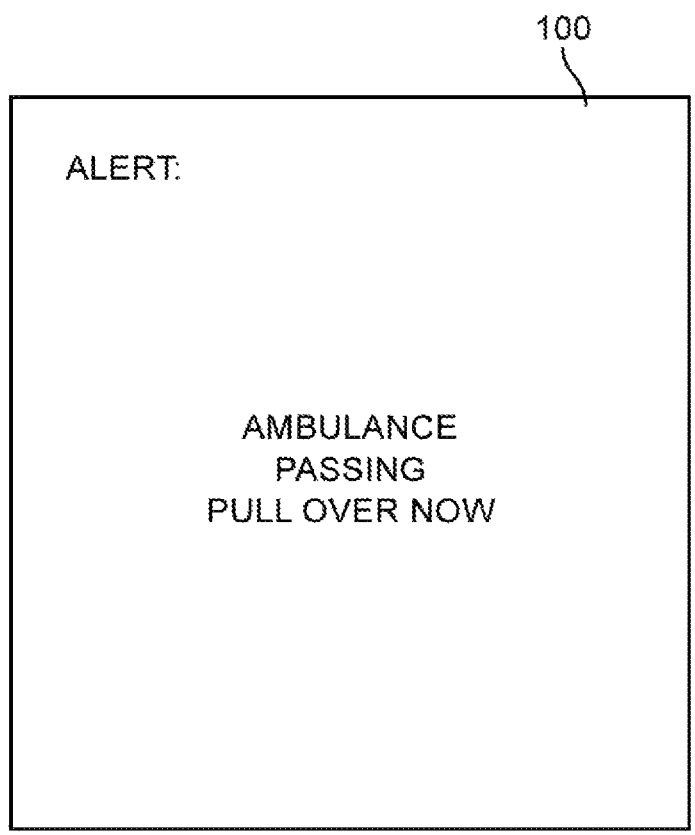
FIG. 9 shows an illustrative display screen in a vehicle that is displaying an alert to a driver concerning the presence of a nearby emergency vehicle in accordance with an embodiment of the present invention.

As shown in the example of FIG. 9, vehicle 10 may provide a driver with alerts such as alert 100 to inform the driver about the presence of emergency services vehicles. Alerts such as alert 100 may be displayed based on information such as the proximity of the emergency services vehicles to the driver, the speed at which the emergency services vehicle is traveling, information on whether the emergency services vehicle is ahead of the driver or is behind the driver, information on whether the emergency services vehicle is actively using a siren, and information on the speed of the driver's vehicle (as examples). Alerts such as alert 100 of FIG. 9 may be presented using audio and/or graphics. Visual alerts may be helpful for drivers that are hearing impaired.

Figure 10:
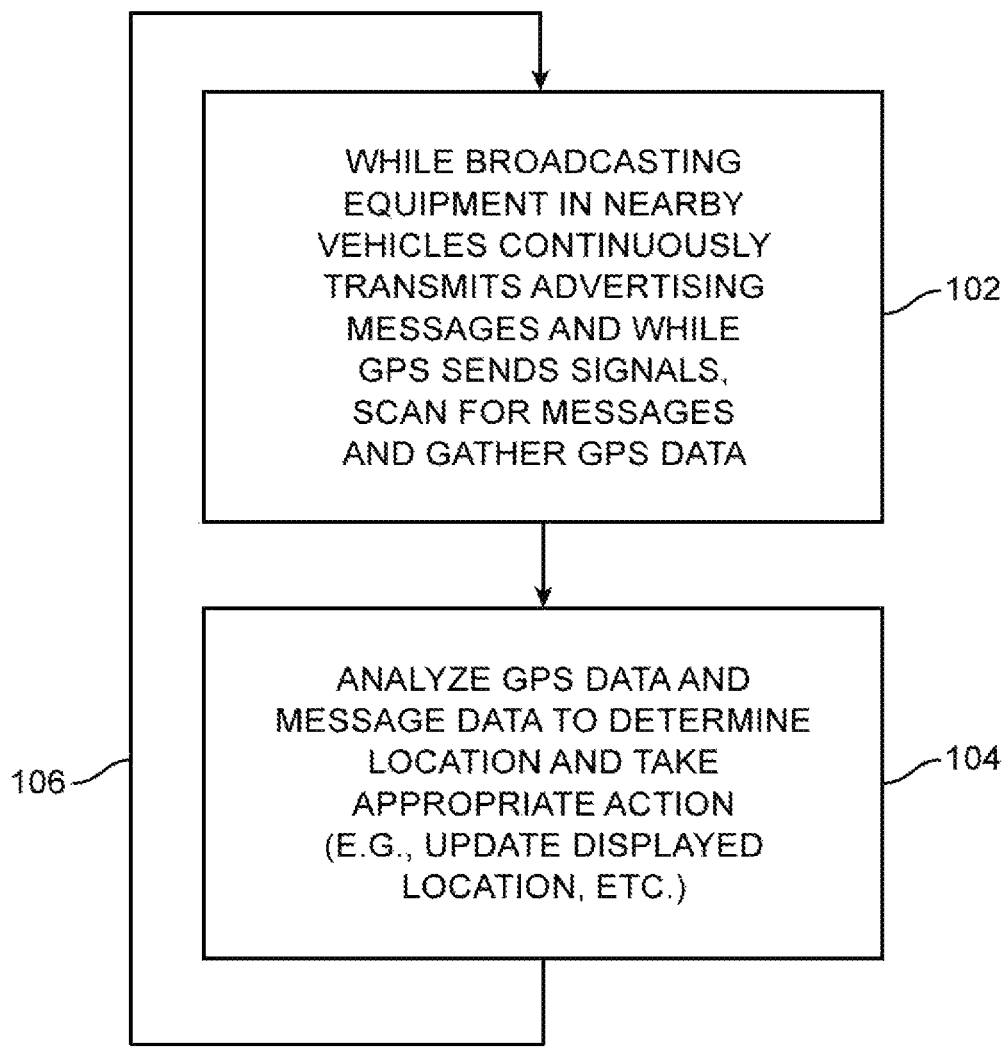
FIG. 10 is a flow chart of illustrative steps involved in wirelessly gathering signals such as locally broadcast wireless messages and satellite navigation system data to use in ascertaining location and providing drivers in vehicles with enhanced situational awareness in accordance with an embodiment of the present invention.

Illustrative steps involved in using vehicles or other moving equipment in a system of the type shown in FIG. 2 are shown in FIG. 10. At step 102, a driver may drive a vehicle along a road. Equipment in the vehicle such as receiver 68 (e.g., Bluetooth Low Energy equipment) may be used to monitor for incoming wireless signals from other vehicles (e.g., Bluetooth Low Energy signals or other signals from transmitters 70). Satellite navigation system signals may also be received by the electronic equipment in the driver's vehicle. Transmitters 70 may transmit messages that contain data (e.g., 32 bits of data or other suitable amounts of data). The data may relate to the status of the transmitting vehicle. Examples of data that may be included in a transmitted message include: information on the vehicle such as vehicle identification number, license plate number, driver name, type of vehicle, make and manufacturer of vehicle, year of vehicle, whether the vehicle is or is not an emergency services vehicle, siren status (on/off), speed of vehicle, driver status (student driver, etc.), weight of vehicle, size of vehicle, vehicle width and/or length, transmitter location (front right corner, etc.), information on the present state of the vehicles steering wheel, brakes, throttle, and other driving controls, or other information related to the transmitting vehicle or its surroundings. Each transmitted message may be received by the receiver in the driver's vehicle for processing.

At step 104, satellite navigation system signals, received wireless signals gathered from transmitters 70 with receiver 68, and/or other information such as vehicle driving status information may be analyzed and suitable action take. During the operations of step 104, control circuitry 40 in the driver's vehicle may use satellite navigation system data to determine the location and velocity of the driver's vehicle (e.g., to display the driver's vehicle on a map as part of an alert or displayed navigation directions). Vehicle status information may be analyzed to determine the direction of travel, speed, and other parameters related to the vehicle's driving status.

During signal processing operations, control circuitry 40 may extract data that was embedded within the messages transmitted by transmitters 70. The receiving vehicle may determine signal strength (e.g., received signal strength indicator values) for each received wireless message. Information on the speed of the driver's vehicle and other operating status information may also be processed. Signal strength information (RSSI values) and information on which transmitters were used to transmit the RSSI values may be used to identify whether nearby vehicles are present and, if present, may be used to ascertain the location of the nearby vehicles, the types of the nearby vehicles that are present, and other information related to the nearby vehicles. This information may then be processed to take suitable action. For example, control circuitry 40 can determine whether collisions are impending or whether situations that require a user's attention are present.

Examples of actions that may be taken by the driver's vehicle at step 104 include controlling the driving behavior of the driver's vehicle and presenting an alert. For example, the driver's vehicle may automatically apply the driver's breaks if it is determined that a nearby vehicle is about to collide with the driver's vehicle. Alerts may be presented to inform the driver of nearby vehicles, the presence of emergency services vehicles, vehicle activity in the driver's blind spot, or other information of interest to the driver. Information may be presented visually using one or more displays, audibly using speakers, or using other input-output circuitry 32 in the driver's vehicle.

As indicated schematically by line 106 of FIG. 10, the operations of steps 102 and 104 may be performed repeatedly (e.g., continuously) during the use of vehicle 10 by the driver.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating receiving electronic equipment in a moving vehicle on a road, the method comprising:
   with the receiving electronic equipment of the moving vehicle, receiving first and second wireless messages that respectively specify first and second locations of a plurality of locations within another object on the road;
   with the receiving electronic equipment of the moving vehicle, using the first and second locations specified in the first and second wireless messages to determine a location of the other object on the road relative to the moving vehicle; and
   with control circuitry in the moving vehicle, intervening in driving activities of the moving vehicle based in part on the determined location of the other object on the road.

2. The method defined in claim 1, further comprising:
   based at least partly on the location of the other object on the road relative to the moving vehicle, presenting an alert by using a display in the moving vehicle to display graphics.

3. The method defined in claim 2, wherein the other object on the road comprises an emergency services vehicle, and wherein presenting the alert comprises:
   presenting information on the display in the moving vehicle alerting a driver of the moving vehicle to the emergency services vehicle.

4. The method defined in claim 2, wherein the other object on the road comprises a nearby vehicle that is passing the moving vehicle, and wherein presenting the alert comprises:
   presenting information on the display alerting a driver of the vehicle to the passing of the nearby vehicle.

5. The method defined in claim 1, wherein the other object on the road comprises a nearby vehicle with a plurality of transmitters, wherein the nearby vehicle comprises a plurality of regions, wherein a first transmitter of the plurality of transmitters is located at a first region of the plurality of regions, wherein a second transmitter of the plurality of transmitters is located at a second region of the plurality of regions, and wherein the first and second wireless messages respectively specify the first and second regions within the nearby vehicle.

6. The method defined in claim 5, wherein determining the location of the other object on the road relative to the moving vehicle comprises:
   determining a first distance from the first transmitter to the moving vehicle;
   determining a second distance from the second transmitter to the moving vehicle; and
   based on the first and second distances, determining the location of the other object on the road relative to the moving vehicle.

7. The method defined in claim 6, wherein determining the first and second distances comprises:
   analyzing the received wireless messages to generate corresponding received signal strength indicator information.

8. The method defined in claim 1, further comprising:
   based on the determined location of the other object on the road relative to the moving vehicle, intervening in driving activities of the moving vehicle.

9. The method defined in claim 8, wherein intervening in the driving activities of the moving vehicle comprises:
   automatically applying brakes in the moving vehicle.

10. The method defined in claim 1, further comprising:
    based at least partly on the determined location of the other object on the road relative to the moving vehicle, intervening in driving activities of the moving vehicle to avoid a collision.

11. The method defined in claim 1, wherein the other object on the road comprises a nearby vehicle having a rectangular outline with four corners, wherein a respective one of a plurality of transmitters is located at each of the four corners, and wherein determining the location of the other object on the road comprises processing received signal strength indicator information associated with the plurality of transmitters in the four corners.

12. The method defined in claim 1, wherein receiving the first and second wireless messages comprises receiving Bluetooth Low Energy messages.

13. The method defined in claim 1, further comprising:
    extracting vehicle type information identifying the another object on the road from the first and second wireless messages.

14. The method defined in claim 1 further comprising:
with control circuitry in the receiving electronic equipment, automatically slowing the moving vehicle based at least partly on the determined location of the other object on the road.

15. Electronic equipment operable in a moving vehicle on a road, wherein the moving vehicle has a plurality of regions, the electronic equipment comprising:
a wireless receiver that receives wireless messages from objects on the road to identify where each of the objects on the road is located, wherein the wireless messages from a first object on the road of one of the objects on the road includes information specifying at least one of a plurality of regions within the first object on the road; and
control circuitry that intervenes in driving activities of the moving vehicle based in part on the identified locations of each of the objects on the road.

16. The electronic equipment defined in claim 15, further comprising:
a plurality of wireless transmitters each of which transmits wireless messages that include information specifying particular regions of a plurality of regions of the moving vehicle in which the plurality of wireless transmitters are respectively located.

17. Electronic equipment in a vehicle on a road, the electronic equipment comprising:
Bluetooth Low Energy equipment that receives Bluetooth Low Energy messages from Bluetooth Low Energy transmitters in nearby objects on the road, wherein the received Bluetooth Low Energy messages comprise information specifying particular regions of a plurality of regions of a first one of the nearby objects on the road in which the Bluetooth Low Energy transmitters are located; and
processing circuitry that uses the information in the received Bluetooth Low Energy messages to determine a location of the nearby object on the road.

18. The electronic equipment defined in claim 17, further comprising:
control circuitry that intervenes in driving activities of the vehicle based at least in part on the determined location of the nearby object on the road.

19. The electronic equipment defined in claim 17, wherein the processing circuitry uses received signal strength indicator information associated with the received Bluetooth Low Energy messages to determine the location of the nearby object on the road.

* * * * *